United States Patent

[11] 3,554,253

[72] Inventor Paul Vasile
124 Dickason St., Jackson, Ohio 45640
[21] Appl. No. 756,569
[22] Filed Aug. 30, 1968
[45] Patented Jan. 12, 1971

[54] COMBINED SLICING, DICING, CORING AND JUICING APPARATUS
9 Claims, 11 Drawing Figs.

[52] U.S. Cl. .................................................. 146/40,
146/78, 146/169
[51] Int. Cl. .................................................. B26d 3/26
[50] Field of Search .......................................... 146/169,
40, 3.9, 160, 170, 171, 3.4, 3.5, 78.1

[56] References Cited
UNITED STATES PATENTS

| | | | |
|---|---|---|---|
| 2,703,522 | 3/1955 | Smith | 146/169X |
| 2,786,502 | 3/1957 | Turner | 146/171X |
| 3,327,621 | 6/1967 | Zysset | 146/169X |

Primary Examiner—Willie G. Abercrombie
Attorney—Hill, Sherman, Meroni, Gross & Simpson

ABSTRACT: A food preparation apparatus includes a pivotally mounted operating arm that carries a detachable reversible, shaped pusher means for driving the object to be prepared into operative engagement with an interchangeable cooperating treating element. Examples of the treating elements are a juicer assembly, corer and cutters.

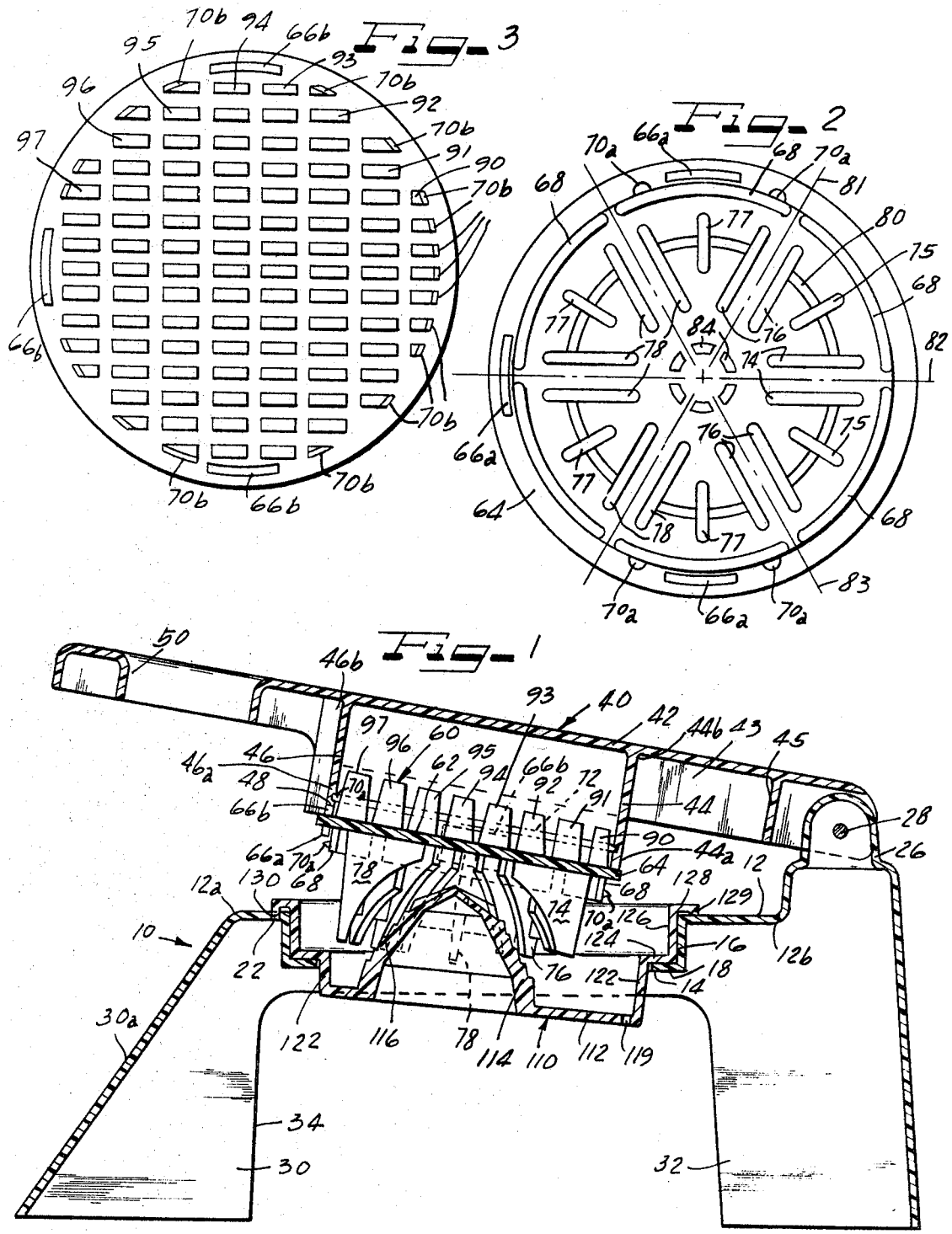

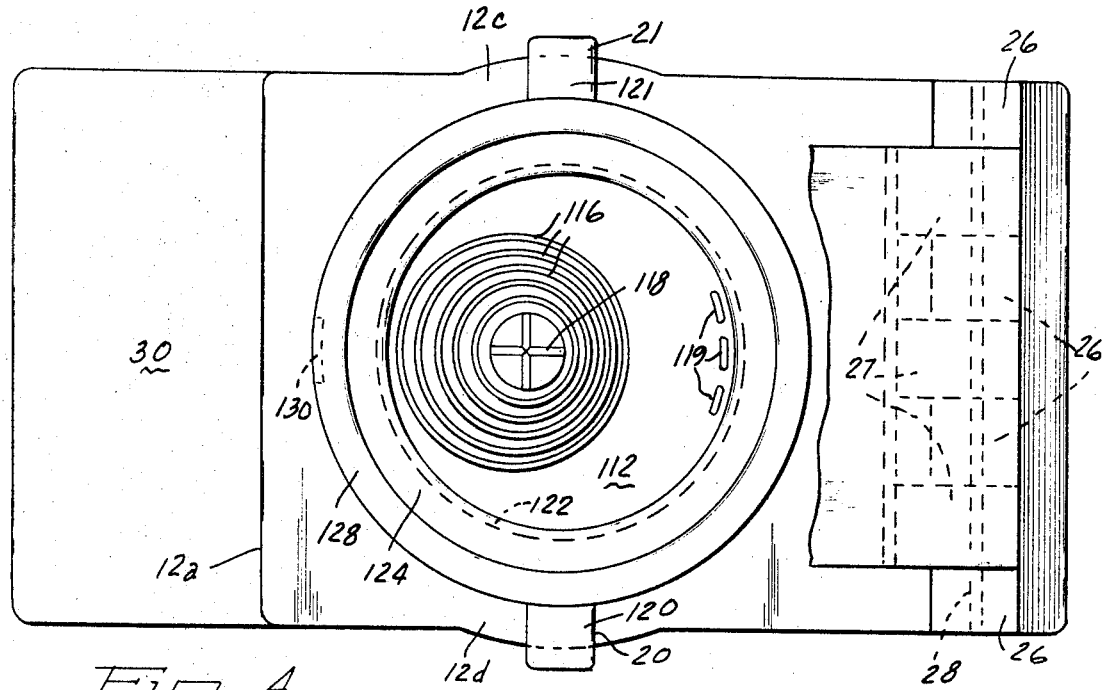
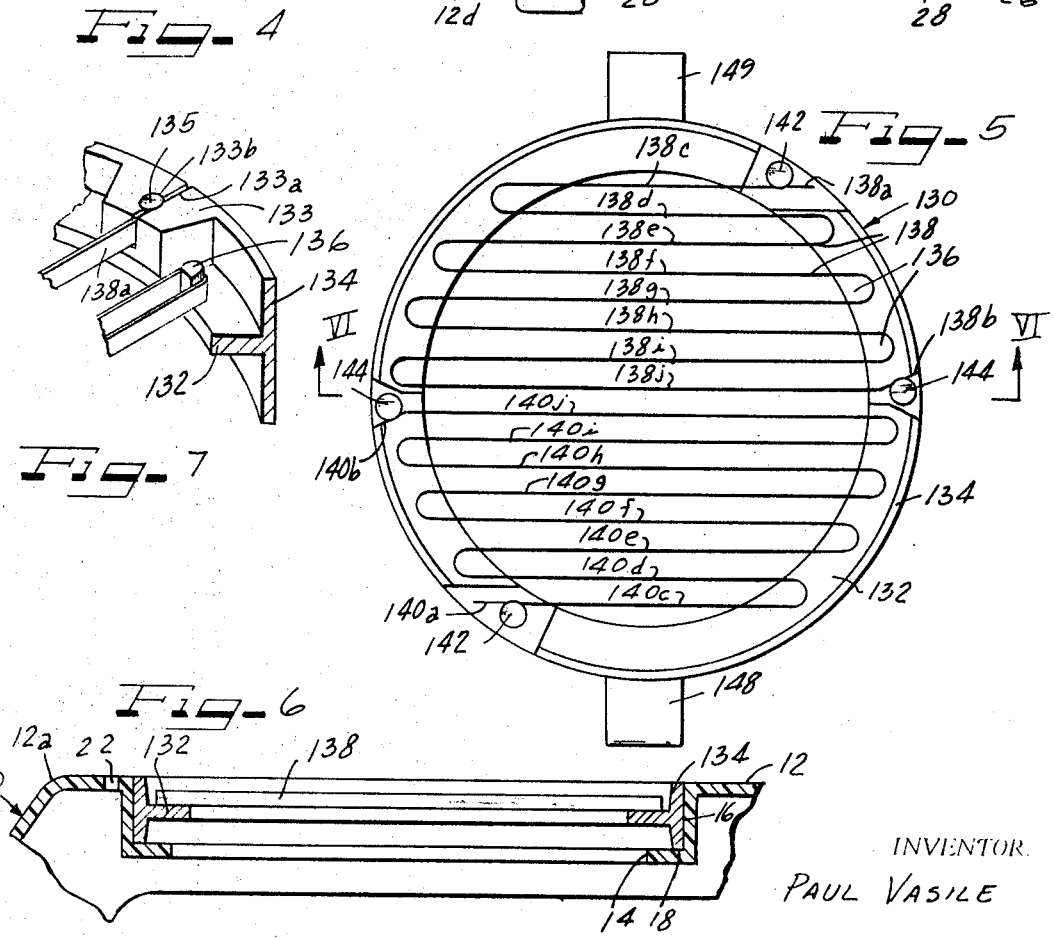

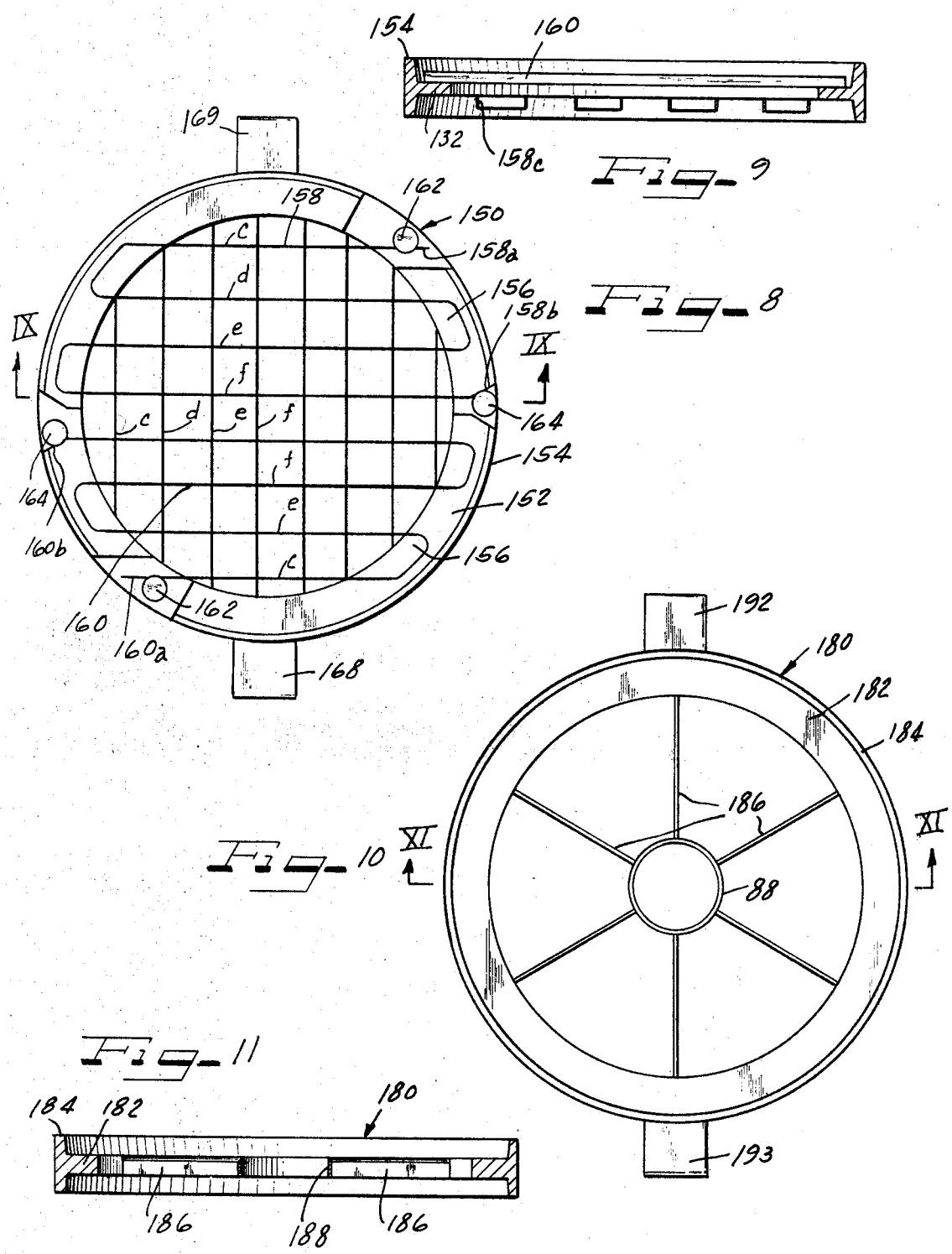

3,554,253

COMBINED SLICING, DICING, CORING AND JUICING APPARATUS

BACKGROUND OF THE INVENTION

1. Field of the Invention

This invention generally relates to a food preparation apparatus having multiple cutting and squeezing functions. More particularly a configured pusher means detachably mounted on a pivotal operating arm serves to press the object to be prepared through a cutter for slicing, dicing and coring or against a male juicer element for squeezing the juice out of the object being prepared.

2. Description of the Prior Art

Food preparation devices of the prior art are limited in the functions that they will perform for, if a number of functions are performed, the devices are usually complicated cumbersome, difficult to adapt and expensive. Thus, a device such as represented in U.S. Pat. No. 3,112,781 requires two hands for operation, includes upstanding guides that have a tendency to bind in their receiving slots if pressure is unevenly applied with both hands and includes compression springs in the guides that provide an increase in cost, and increase in the cleaning problems and a storage problem. Moreover, the pusher member is permanently secured to the head portion. In addition to the structural disadvantages there is a distinct design disadvantage in that the straight reciprocating pushing movement provides no mechanical advantage.

SUMMARY OF THE INVENTION

We have provided a simple efficient economical food preparation apparatus which overcomes these and other problems of the prior art in its design and function. Briefly our invention comprises a raised base having an opening therein which receives a removably positioned processing member therein. An operating arm pivotally attached at its one end to the base carries a detachable, reversible pusher means thereon which is aligned with the processing member and cooperates therewith when the operating arm is pivoted toward the base. When the processing member is either a single direction or multidirection cutter the pusher will be configured such that the extensions or projections thereon have entry to the spaces between the blades. Similarly when the processing member is a juicer for squeezing the juice out of an article to be processed or the core is to be removed from an article such as an apple or orange, a pusher member is required that will accommodate the configuration of the article and hold the article in position for proper processing. In the later case the pusher projections will form a concave pressure surface about the article. Slots or spaces between the projections will allow the same pusher to be used in a coring operation.

BRIEF DESCRIPTION OF THE DRAWINGS

FIG. FIG. 1 is a cross section elevational view of the apparatus with the juicer elements in operative position;

FIG. 2 is a plan view of the juicer-corer pusher;

FIG. 3 is a plan view of the cutter pusher;

FIG. 4 is a plan view with a part of the operating arm cut away to apparatus base with the juicer processing member in position;

FIG. 5 is a plan view of a single direction cutter member;

FIG. 6 is a cross-sectional view of the cutter taken along the lines VI–VI in FIG. 5 and additionally includes a portion of the base adjacent the cutter;

FIG. 7 is a perspective view of a portion of a cutter ring such as that shown in FIG. 5 wherein a typical connection of the cutter blade to the ring may be seen;

FIG. 8 is a plan view of a two direction cutter;

FIG. 9 is a cross-sectional view of FIG. 8 taken along the lines IX–IX;

FIG. 10 is a plan view of the corer cutter; and

FIG. 11 is a cross-sectional view of FIG. 10 taken along the lines XI–XI.

DESCRIPTION OF THE PREFERRED EMBODIMENT

Referring to FIG. 1 of the drawings the apparatus of the present invention is shown in an operative position with the juicer processing member and juicer pusher in cooperative position as they might be when processing a half orange for example. The apparatus comprises a base generally indicated at 10 which has a planar upper portion 12 with an opening 14 therethrough through which the material to be processed passes. A depression 16 including a ledge 18 surrounds the opening 14 and provides alignment and support for the processing member.

The processing member may extend slightly above the level of the upper portion 12 as is the case of the juicer member 110 or it may be substantially flush therewith as is the case with the cutters and the corer. While the opening 14 and the surrounding depression 16 may be of any shape and size, I have found it most advantageous to employ a circular configuration. In the case of a circular configuration the provision of locating notches 20, 21, 22 in the upper surface spaced about the periphery of the openings allows accurate and consistent positioning of the juicer and cutter processing member. Also these notches prevent the movement of the processing member during operation.

The limits of the planar upper portion 12 may be roughly defined by a front edge 12a opposite edges 12c, 12d and a rear edge 12b. The notches 20 and 21 are conveniently located on opposite sides of the opening while the slot or notch 22 may be in the front of the base near the front edge. The latter notch 22 is most important with a processing member such as the juicer as shown, where the inclination of the member must be such as to mate with the pusher element. The notches 20, 21 and 22 may be of an any configuration however we have found it convenient to form the notches 20 and 21 recesses and the upper portion 12 and to configure the locating means 22 in the form of a slot.

A hinge portion 26 is provided on the base 10 adjacent the rear edge 12b. The hinge portion 26 may be integrally formed with the base as shown in FIG. 1. The hinge portion 26 may be raised above the plane of the upper surface to allow the proper cooperation between the pusher means and the processing member. Thus there is general compliance of the lower surface of the operating means with the planar upper portion 12.

Legs 30, 32 raise the planar upper portion 12 above a working surface and allow the removal of the processed material. Two legs are shown in FIGS. 1 and 4 however this is by way of example only since the entire base may serve as a leg with an exception for an access area to the area below the processing member. Thus at least one opening 34 should be provided in one of the sides so that removal of the processed material may be conveniently readily affected. The legs are shaped to provide stability to the apparatus when pressure is being exerted by the operating arm. Thus I have found that extending the lowermost portion of the leg 30 to a point beyond where the end of the operating arm will be in its operative position prevents overturning since the downward component of the force being exerted would pass through the base. A front sloped portion 30a provides a boundary for the leg member 30 and also provides a convenient work area on which a grater or slicer may be conveniently installed. This of course would increase the adaptability and the uses of my apparatus, however, since these devices are old and well known my suggestion to the mechanic skilled in the art should be sufficient.

An operating arm means 40 having a front, rear and opposite sides which may conveniently correspond in general configuration to the upper planar surface 12 is securedly hinged by hinge portions 27 to corresponding portion 26 or the base 10. A hinge pin 28 completes the hinged joint between the base and the operating means. It is important this hinge be strong and durable because much pressure may be applied thereto. The operating means 40 comprises a generally planar member 42 which may be formed with a depending apron 43 about its edge. The planar member 42 and the side member 43 may be reinforced where necessary by reinforcing ribs 45. A handle means 50 may be formed in the front of the operating means by the provision of a hand-sized opening. It is contemplated however that the handle means 50 may assume other equivalent embodiments. Designwise, the handle should be near the front of the operating means to provide a mechanical advantage and should be durable and convenient. It is also understood that the further removed the handle means 50 is from the hinge pin 28 the greater the mechanical advantage will be and therefore it is within the contemplation of this invention that the handle may extend beyond the base 10 and in fact may be extensible to move from a position over the base 10 to an outwardly position keeping in mind however securement against tipping. In the formation of the apparatus of a molded high impact material such as plastic, the handle means 50 with downwardly depending lips as shown has a very high strength to weight ratio.

A depending resilient retaining means 44, 46 is a part of the operating means 40 and provides for the attachment of the pusher means 60. The retaining means has been designated 44 and 46 however it is to be understood that the retaining means advantageously is a single cylindrical construction as is shown. As may be best seen in FIG. 1 the retaining means 44, 46 is attached to the operating means 40 along an upper edge 44b, 46b and has a depending lower edge portion 44a, 46a. The retaining means may be integral with or attached to a generally planar member 42 so that a very strong and secure holding means is provided. The members 44, 46 will generally assume the plan view configuration of the pusher members 60 so that support is provided about the periphery of the pusher member.

The retaining means 44, 46 must first be long enough to accept the longest projections that will be used on the pusher means and secondly must be long enough to extend to the recess 16 when the operating means 40 has fully forced the pusher means 60 into operative position with the processing members. To assure that the angle of engagement of the pusher means 60 with the processing members is correct I have found that positioning the lower edges 44a and 46a of the retaining means in a plane parallel with that of the member 42 is very satisfactory.

Since the pusher means and the retaining means will generally take the configuration of a circle it is important to provide means for properly orienting the pusher means 60 on the retaining means 44, 46. To accomplish this I have provided notches 48 in the lower edge 44a, 46a spaced about the periphery of the retaining means 44 and 46 which will accept corresponding raised portions 66a on the pusher means. A groove 72 extends around the inside periphery of the retaining means at a distance from the lower edge 44a, 46a slightly greater than the depth of the notch 48. A reversible, detachable pusher is provided to allow the pusher to be changed to correspond to the particular processing member being used. Thus, as may be seen, one pusher configuration may be best suited for a juicing operation whereas another entirely different configuration may be necessary in a cutting operation. A further advantage in providing a detachable reversible member is that not only is the efficiency of the apparatus greatly increased, but also storage and cleaning problems are greatly simplified. Moreover, a greater flexibility in use is possible because of the interchangeability of both the processing member and the pusher means.

The pusher includes a central support portion 62 having laterally extending lips 64 that abut the edges 44a, 46a of the retaining means. The pusher 60 is held in place by the resilient cooperation of a series of bosses 70a with the peripheral groove 72. Suitable reinforcement of the retaining means 44 and 46 may be provided to assure that they retain their resiliency and stability over long periods of use. To provide the locating function in conjunction with the retaining means, similar locating teeth 66a and 66b have been provided on either side of the central support portion 62. These teeth are located at three of the quarter points and mate with the locating notches 48 on the bottom edge of the retaining means 44a, 46a to assure consistent alignment.

Referring to the construction of the juicer side of the pusher it may be seen that a segmented skirt 68 upstands from the central support portion 62 and provides a support for the bosses 70a located thereon. The skirt 68 is segmented to allow the cutting blades or coring knife to pass therebetween. This skirt must be resilient since it provides the snap action whereby the bosses 70a snap into a groove 72 in the inside surface of the retaining member 44, 46. This snap action attachment means has been found to be very effective and efficient. A number of projections 74, 75, 76, 77 and 78 are provided on the surface of the central support portion 72 and are of a length and configuration to cooperate with the juicer and the corer. The projections 74, 75 and 76 are slightly shorter than the projections 77 and 78 to prevent interference of the projections with the upstanding male juicer member when the pusher means moves into operative position. An arclike stabilizing projection 80 extends between the projections in the area of each segment. Another segmented upstanding projection 84 centrally located provides the pusher action for the core cutter as will hereinafter be more full fully explained. This core apparatus has cutting blades disposed on the axes 81, 82 and 83 and therefore skirt 68 and the stabilizing projection 80 are interrupted in the area of intersection of these cutting axes.

The juicer member 110 has an inclined bottom 112 which provides the basis and support for an upstanding male juicer element 114. The element 114 comprises a stepped structure described as configured of a stack of progressively smaller concentric conic frustums 116 having an inclined axis. This stepped structure which may be seen in cross section in FIG. 1 provides pressure and squeezing areas that have been found effective in juicing operation. At the lowermost point of the inclined bottom a drainage means 119 consisting of a number of holes are provided so that the juice may be conveniently removed. In addition as may be best seen in FIG. 4 handling ears 120 and 121 are provided on opposite sides of the juicer processing member to provide ease of handling and removal as well as locating. These ears 120, 121 fit into locating notches 20 and 21 in the upper surface of the base. A conically configured side portion 122 surrounds the inclined bottom 112 and provides the lower portion of a juicer side wall. A laterally projecting ledge 124 and upper side member 16. A laterally extending lip 128 is attached to the upper edge of the upper side member 126 and includes a downwardly extending rim 129 that bears against the upper planar surface 12. It may thus be seen that for the juicer processing member at least, support is provided on both the ledge 18 and the upper portion 12. Movement of the processing member is prevented by a mating fit with the depression 16 around the periphery of the processing member. In addition to the locating tabs 120 and 121 on opposite sides of the juicer processing member there is provided on the rim 129 a depending tooth 130 which engages the locating notch 22 at the front of the planar upper portion 12. The locating notch 130 assures that the juicer member is properly oriented for cooperation with the juicer pusher member in the operating arm.

The juicer member 110 need not have the holes 118 but in fact may be of much deeper design so that the juice resulting from the operation thereof will be contained within the juicer processing member for subsequent handling.

With regard to the construction of the juicer pusher and the juicer processing member it is to be emphasized that the size of the pusher projections 74 through 78 may vary in height, depth and width depending upon the anticipated use thereof. Moreover the configuration of the upstanding male juicer member 114 may also be varied to accommodate any type of object to be processed.

There is shown in the upper portion of the upstanding male juicer member 114 a number of cutting and drainage grooves 118 which function to impale the object to be processed on the upstanding member and to provide for the escape of juice from the interior areas of the object being processed. These channels are merely representative and may be configured to pass down through the sides of the upstanding male member 114 if conditions so require.

Interchange of the various processing members and pushers is very rapidly and conveniently accomplished. Referring to FIGS. 1 and 2 for example the juicer processing member 110 may be removed from the base 10 after processing by swinging the operating arm 40 out of the way, i.e., to a generally vertical inclination, and grasping the ears 120, 121, which project beyond the edges 12c and 12d of the base. The juicer member 110 is now simply lifted out of position and the base is ready to receive a new processing member. With the operating arm upwardly pivoted the pusher means is easily accessible and may be easily grasped by the lip 64 which projects beyond the retaining means 44, 46 or by the projections themselves to snap the pusher out of its retaining means. The pusher is then inverted and snapped into position to effect the change. Of course cleaning may be easily accomplished while the pusher is out of position.

Referring to FIG. 1 it may be seen that rows of projections 90 through 97 on the cutter side of the pusher 60 gradually increase in length from the rear to the front. This graduation is provided to not only present the maximum pusher end areas against the object to be processed at the point during its initial processing or cutting but also so that as the processing is completed the areas to be cut and the cutting force will be gradually and evenly reduced to zero. In other words in the case of the processing of material initially having its upper planar surface parallel to the cutting blades, when the cutting operation is about to be completed the planar surface will not be parallel, but will be inclined to the top edges of the cutting elements so that cutting completion is sequential. This will solve a problem where the last portion of the planar surface might be the heavy rind of cheese for example which would require an extremely large amount of force to cut at once but a much smaller amount when the rind was being cut only a portion at a time. The slope of graduation of the rows of projections 90—97 will determine the rate at which this last surface would be cut.

Referring to FIG. 3 the cutter side of the pusher may be seen with its rows 90 through 97 of spaced projections. The spacing and configuration of the projections follows that of the cutter members. In this particular case the illustrated pusher is adapted to accommodate both the single direction cutter of FIG. 5 and the multidirection cutter member of FIG. 8. Attachment of the cutter side of the pusher means to the retaining means 44, 46 is also accomplished by the provision of an upstanding skirt 68 having bosses 70a which will mate with a notch or groove 72. An alternative construction also providing excellent results is a small rib 70b spaced above the central support portion 62 on the circumferential edges of the projections in the rows 90 through 97. The ribs 70b also mate with the groove 72. Locating teeth 66b correspond in size, shape and location to the locating teeth 66a previously described for the juicer side of the pusher.

In operation the pusher member is effective to move the object to be cut substantially clear through the spaces between the blades with the aid of the extensions or projections on the pusher member that are arranged in a pattern conforming to the spaces defined by the blades of the cutting unit so as to permit ready entry of such extensions into said spaces between the blades. This operation may be visualized with reference to FIG. 6 wherein one embodiment of the cutting processing member is depicted in position in the recess 16 over the opening 14.

Referring to FIGS. 5 and 6, the plan and cross section of a single cutter 130 may be seen. Having a circular outer configuration that corresponds in size to the recess 16 of the base, the cutter 130 comprises a ring 132 having a rim 134 extending therearound. The rim may project beyond both sides of the ring 132 and as shown in FIG. 6 may be of a size to allow it to conform to the depth of the depression 16. A series of spaced alternately opposed posts 136 provide a means about which a pair of convoluted blades 138 and 140 may be passed.

The blades 138 and 140 each have a first end 138a, 140a and a second end 138b, 140b which is securely fastened to the ring 132 at a gripping block 133 spaced along the rim 132 and the rim 134 as may be seen in FIG. 7. Thus, the blade end 138a is received in a slot 133a. The slot 133a passes through a hole 133b along a chord of the hole 133a. With the blade end 138a substantially filling the slot 133a a serrated tapered pin 135 is driven into place in hole 133b to firmly secure the end 138a in place in the gripping block 133. The other end 138b of the blade 138 is similarly secured in position to securely hold the blade in place under tension. With the cutting blade 138 in place a number of cutting elements identified as 138c through j are formed on the cutting ring 130. The number of cutting elements which are formed by each of the blades 138 and 140 will of course depend on the spacing of the cutting elements and the size of the processing member. We have found that for processing food such as potatoes, cucumbers etc. a spacing of about one-fourth inch is desirable. The cutting blade 138 and 140 may be of flat blade stock having a cutting edge along its upper edge or may be made from an equivalent thin wire. The cutting blade 140 is essentially a duplicate of 138 and is positioned on the ring in mirror image relation. To allow ready removability of the processing member 130 from the base 10 we have provided ears 148 and 149 projecting from the opposite sides of the ring and corresponding to the locating depressions 20 and 21 in the surface 12 of the base 10.

In FIGS. 8 and 9 there is shown a two-way cutting blade having the cutting elements spaced one-half inch apart and thereby forming ½-inch squares. The cutting element 150 constructed similarly to the ring 130 with a ring 152 having a rim 154 therearound. Similarly posts 156 spaced about the periphery of the ring 152 depend from opposite sides of the ring its so that blades 158 and 160 may be threaded therearound to provide the cutting elements designated by the suffixes c, d, e and f. A means similar that previously shown in FIG. 7 securely holds the blade ends 158a, 158b, 160a and 160b in position. A similar construction and blade arrangement on the opposite side of the ring 152 is angularly disposed with respect to the first or upper disposition. Inasmuch as this construction is the same it is not shown since it would amount to merely adding a prime suffix to each of the numerals shown. FIG. 9 aptly illustrates the opposite angularly related disposition of the two sets of cutting means. If the cutting elements 158 and 160 are elongated flat blades with a cutting configuration along only one edge it is imperative that this cutting edge face to the same side as its opposite blade counterpart. If the cutting blades are double edged or wire not change in the disposition of the cutting blade need be made. Again a pair of ears 168 and 169 serve not only to locate the processing member 150 in the recess 16, but also facilitate handling.

FIG. 10 illustrates what is termed a corer processing member which serves to simultaneously remove the core of an apple or orange for example and section the fruit. This coring cutter cooperates with the juicer side of the pusher seen in FIGS. 1 and 2 to produce its desired desired result. The construction of the corer 180 is similar to that of the previously set out cutter processing members and includes a ring 182 surrounded by a rim 184 and having attached thereto projecting ears 192 and 193 so that it may be seated on the ledge 18 in the recess 16 over the opening 14. A number of cutter elements 186 hold a circular cutter ring 188 in position in the central portion of the processing member. The cutting elements 186 will usually be straight so that the sectioning of the object to be processed is accomplished. The circular cutting element 188 may be of a flat blade material having an upper sharpened edge whereas the cutting elements 186 may be either of a similar flat blade construction or of an equivalent wire. In the cross section taken along the line XI-XI the member 186 is shown of a flat blade material. The cutting the ends of the cutting elements 186 may be attached to the ring 182 in a manner previously described with relation to FIG. 7 or may be secured by tack welding to ring 182.

As previously described, operation of the apparatus is simple, quick, convenient and efficient. The processing member is easily handled by the ears provided thereon even with wet or greasy hands. The ears moreover serve to locate and position the processing member on the base so that consistent processing operations result. In the case of the juicer processing member it has been seen that its orientation in the recess opening must be such that it perfectly cooperates with the juicer pushing member 60 and therefore an additional locating means 130 is provided thereon. The upstanding male juicer member is pointed and grooved so that the article to be processed, as for example a half orange, may be impaled on the tip of this member and thereby held in position until the pusher member fully cooperates with its outer surface. It is important to note that the configured pusher 60 will cause the orange half to be centered perfectly on the upstanding juicer member so that maximum processing may be effected. This effectiveness is also assured by the inclined attitude of the upstanding male processing member whereby its center axis is substantially perpendicular to the central plane of the handle thereby assuring the exertion of maximum pressure by the pusher on the object being processed.

When it is desired to change from a juicer-processing member to a coring processing member the pusher need not be changed as the juicer pusher also functions as the pusher for the core cutter. Thus it may be seen in FIG. 2 that the cutting elements 186 will lie on the diameters 81, 82 and 83 while the upstanding segmented circular projections 84 will fit within the cutting element 188. The members 84 are segmented so that if a sectioning cutter having cutting elements coextensive with the diameters 81, 82 and 83 were provided this pusher could also be used therefore.

To change from the juicer or corer processing member to a single or multidirection cutting member it will be necessary that both the processing member and the pusher means 60 be changed. Removal of the pusher 60 from the operating arm 40 involves simple snapping it out of the retaining means 44, 46, reversing it and snapping it back into the retaining means.

It may thus be seen from the foregoing disclosure that I have provided a cutting apparatus for slicing, dicing, coring and juicing that is of a simple, economical and efficient structure and that provides quick relatively effortless one handed operation. Complete interchangeability to the processing members and pusher means results in great flexibility to the apparatus so that a very wide range of materials and objects may be processed. The apparatus may be readily assembled and disassembled for cleaning and repairing. Thus if a pusher projection should somehow be broken this part may be readily replaced in contrast to aforementioned apparatus of the prior art in which at a minimum the entire operating arm would have to be discarded. Repair of the individual processing members is simplified by the removability of the cutting blade for example so that they may be sharpened or replaced.

While I have illustrated and described one form of the invention, it will now be apparent to those skilled in the art that certain changes, substitutions, additions, and omissions may be made in the exemplary form shown without departing from the spirit and scope of the invention as defined by the appended claims.

I claim:

1. A food preparation apparatus comprising in combination, a base, said base having a pivot means thereon, an opening in the base, a processing member, said processing member removably positioned in said opening, an operating arm, said operating arm being attached to the pivot means, a detachable and reversible pusher means, a retainer means on said operating arm, said retainer means holding said detachable pusher means, said pusher means cooperating with said processing member to prepare the food upon operation of said operating arm, said base having a planar upper portion, said opening being in said planar upper portion, and a depression including a ledge surrounding said opening providing a seat for said processing member.

2. A food preparation apparatus in accordance with claim 1 wherein said processing member comprises a cutter having a circular outer configuration that corresponds in diameter to the opening in the planar upper portion and which corresponds in depth to the depression about said opening, said cutter including a ring having a series of spaced alternately opposed posts thereon, a pair of convoluted blades being wound about said posts in generally parallel relationship, said blades each having a first end and a second end securely fastened to the ring at a gripping block, said gripping block having a slot therein receiving one of said blade ends, said slot further having an enlargement therein, a serrated tapered pin being driven in said enlargement to secure said blade end firmly in place.

3. A food preparation apparatus according to claim 2 wherein said rim has an upper side and a lower side, posts projecting from both said upper side and said lower side supporting blade elements thereacross, said blades about said upper posts being transverse to said blades about said lower posts.

4. A food preparation apparatus in accordance with claim 1 including leg structures depending from said planar upper portion of said base whereby when said apparatus is positioned on a working surface said legs raise the opening and said processing member therein to allow access to the food passing through the processing member and opening, said planar upper portion having a front, rear and opposite sides, the leg structure adjacent and depending from the front of the upper portion sloping away therefrom so that said leg surface provides a working area in which further food processing steps may be performed.

5. A food preparation apparatus in accordance with claim 4 wherein said pivot means comprises a hinge having hinge elements integrally formed with said operating arm and the rear of said planar upper portion.

6. A food preparation apparatus in accordance with claim 1 wherein said processing member is a juicer seated in said depression, said juicer having a cuplike configuration with a planar bottom inclined at an angle with the planar upper portion, an upstanding male juicer element centrally positioned on said bottom and extending upwardly through said opening, said male juicer element comprising a stepped structure having a configuration of a plurality of stacked progressively smaller conic frustums with a pointed conical structure at its uppermost point, said conical structure having cutting and drainage grooves therethrough whereby the object to be processed may be impaled on said male juicer element, said cooperating pusher means having a generally concave female configuration conforming to the upstanding male juicer member, said configuration being achieved by a plurality of upstanding projections of varying length and configuration whereby when said operating arm is moved into operative position said pusher will move the object to be processed against the juicer-processing member.

7. A food preparation apparatus according to claim 1 wherein said pusher means includes a central support portion having laterally extending lips that abut and extend beyond the retaining means, said retaining means having locating notches adjacent the area of abutment with the pusher means, said pusher means having corresponding locating teeth which mate with said locating notches thereby allowing precise and consistent orientation of said pusher means, said reversible pusher means having a juicer pusher means extending from one side of said central support portion and a cutter pusher means extending from the opposite side of said central support portion, said juicer and cutter pushers comprising a plurality of upstanding laterally resilient projections, said retaining means surrounding at least one of said juicer or cutter pusher means, said upstanding projections having outwardly extending bosses in the areas in contact with the surrounding retaining means, said retaining means having a corresponding groove receiving said bosses and thereby retaining said resiliently biased bosses.

8. A food preparation apparatus according to claim 1 wherein said processing member is a cutter having spaced cutting elements and said pusher means has projections spaced to pass between the cutting elements so that when said operating arm is operated said projections will force the object to be processed past the cutting elements, said cutter pusher comprising rows of graduated projections graduated so that the rows progressively and not simultaneously pass the upper edge of the cutting elements whereby completion of the cutting operation is sequential.

9. A food preparation apparatus according to claim 1 wherein said processing member is a corer having a central circular cutting element with radially extending sectioning cutting elements, and said pusher means comprises a plurality of upstanding projections having upper edges, said upper edges of said upstanding projections defining a cuplike concave configuration, said projections having spaces therebetween, said spaces receiving said cutting elements whereby said projections push the object to be processed past the cutting elements.

UNITED STATES PATENT OFFICE
CERTIFICATE OF CORRECTION

Patent No. 3,554,253            Dated January 12, 1971

Inventor(s)   Paul Vasile

It is certified that error appears in the above-identified patent and that said Letters Patent are hereby corrected as shown below:

Column 1, line 24, change "and" to --an--.

Column 2, line 67, change "securedly" to --securely--.

Column 3, line 51, after "notch 48." begin a new paragraph.

Column 4, line 20, between the words "more and fully" delete "full"
line 42, delete "16." and add the following --126 are con figured to conform to the ledge 18 and depression 16.--

Column 6, line 31, between the words "ring and so" delete "its" and insert --152--;
line 33, after "similar" insert --to--;
line 45, change "not" to --no--;
line 54, the word "desired" appears twice;
line 67, change "line " to --lines--

Column 7, line 34, change "simple" to --simply--.

Signed and sealed this 28th day of March 1972

(SEAL)

Attest:

EDWARD M. FLETCHER, JR.
Attesting Officer

ROBERT GOTTSCHALK
Commissioner of Patents